United States Patent [19]

Lange

[11] Patent Number: 4,621,573

[45] Date of Patent: Nov. 11, 1986

[54] APPARATUS FOR CLEANING FRUITS AND VEGETABLES

[76] Inventor: Fritz Lange, Lindenallee 21, 2355 Schonboken, Fed. Rep. of Germany

[21] Appl. No.: 647,672

[22] Filed: Sep. 5, 1984

[30] Foreign Application Priority Data

Sep. 6, 1983 [DE] Fed. Rep. of Germany ....... 3332048

[51] Int. Cl.$^4$ ............................................ A23N 7/00
[52] U.S. Cl. ...................................... 99/626; 15/3.16; 15/3.2; 99/623; 99/628
[58] Field of Search ................ 15/3.11, 3.14, 3.16–3.2; 99/584, 623, 626, 627, 628–630

[56] References Cited

U.S. PATENT DOCUMENTS

| | | | |
|---|---|---|---|
| 256,598 | 4/1882 | Rice et al. | 99/626 X |
| 267,021 | 11/1882 | Schulte | 99/626 X |
| 431,785 | 7/1890 | Short | 99/626 X |
| 1,645,516 | 10/1927 | Benninger | 99/626 |
| 2,037,266 | 4/1936 | Ranney | 15/3.11 |
| 2,038,018 | 4/1936 | Wortelboer | 99/626 |
| 2,154,106 | 4/1939 | Nicosia | 15/3.16 |
| 2,164,372 | 7/1939 | Anderson | 99/627 |

FOREIGN PATENT DOCUMENTS 576582  5/1933  Fed. Rep. of Germany ........ 99/630

*Primary Examiner*—Timothy F. Simone
*Attorney, Agent, or Firm*—Collard, Roe & Galgano

[57] ABSTRACT

A fruit and vegetable cleaning apparatus is provided for removing damaged, textured skin impurities which has a loading opening, a housing enclosing a revolving conveyor drum which is partially surrounded by a plurality of abrasive elements by means of which said fruits and vegetables are cleaned.

12 Claims, 7 Drawing Figures

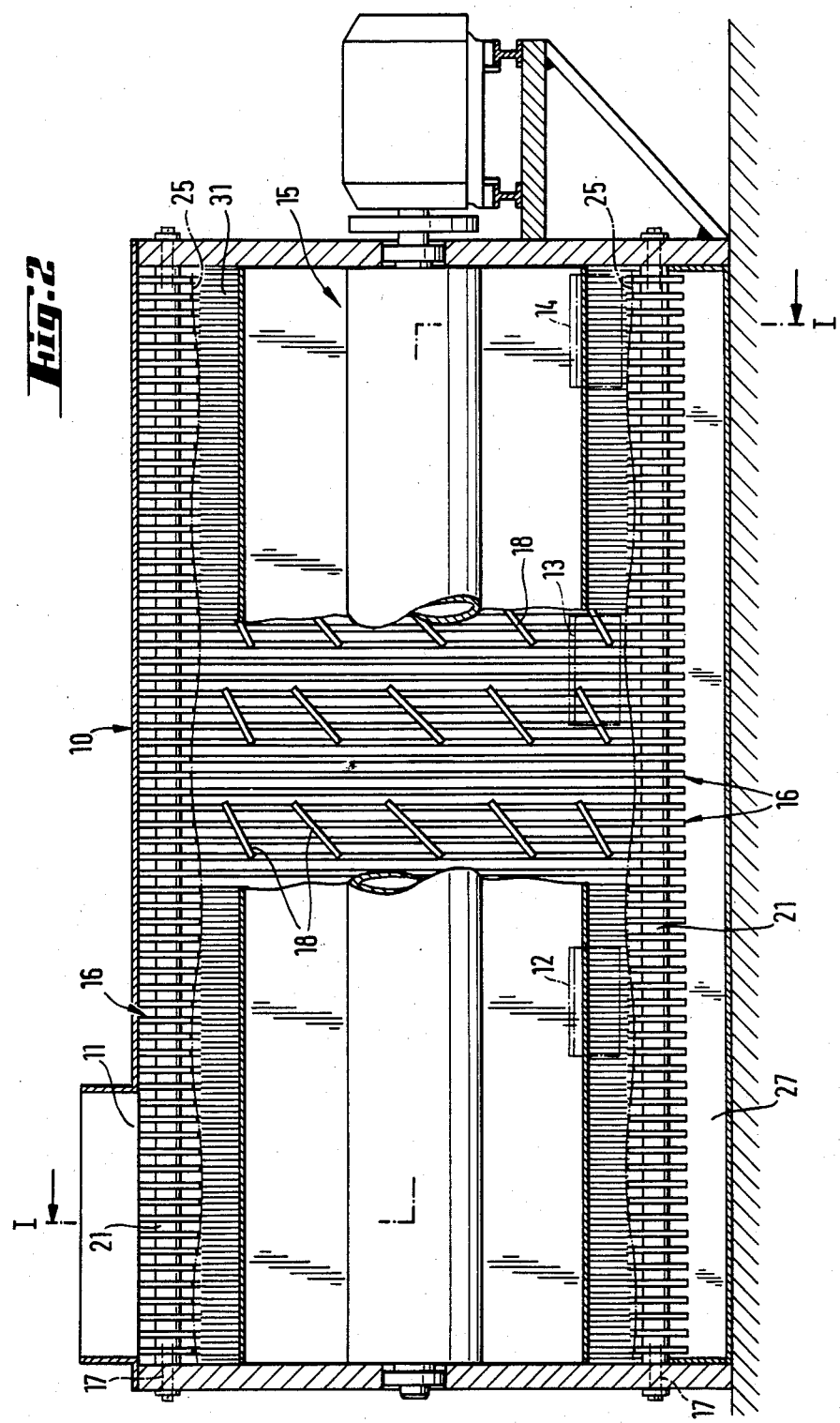

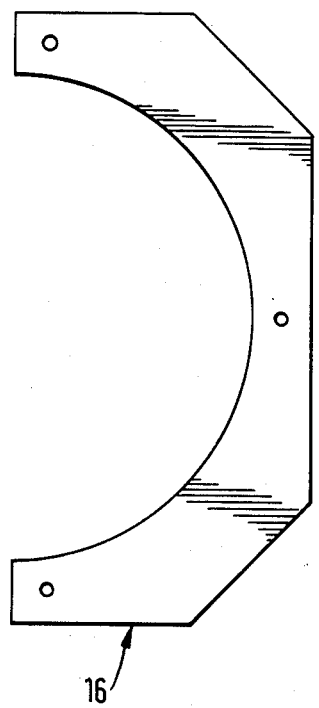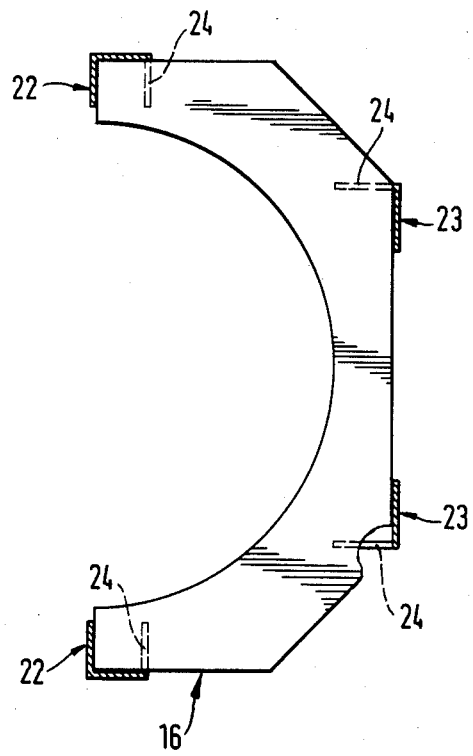

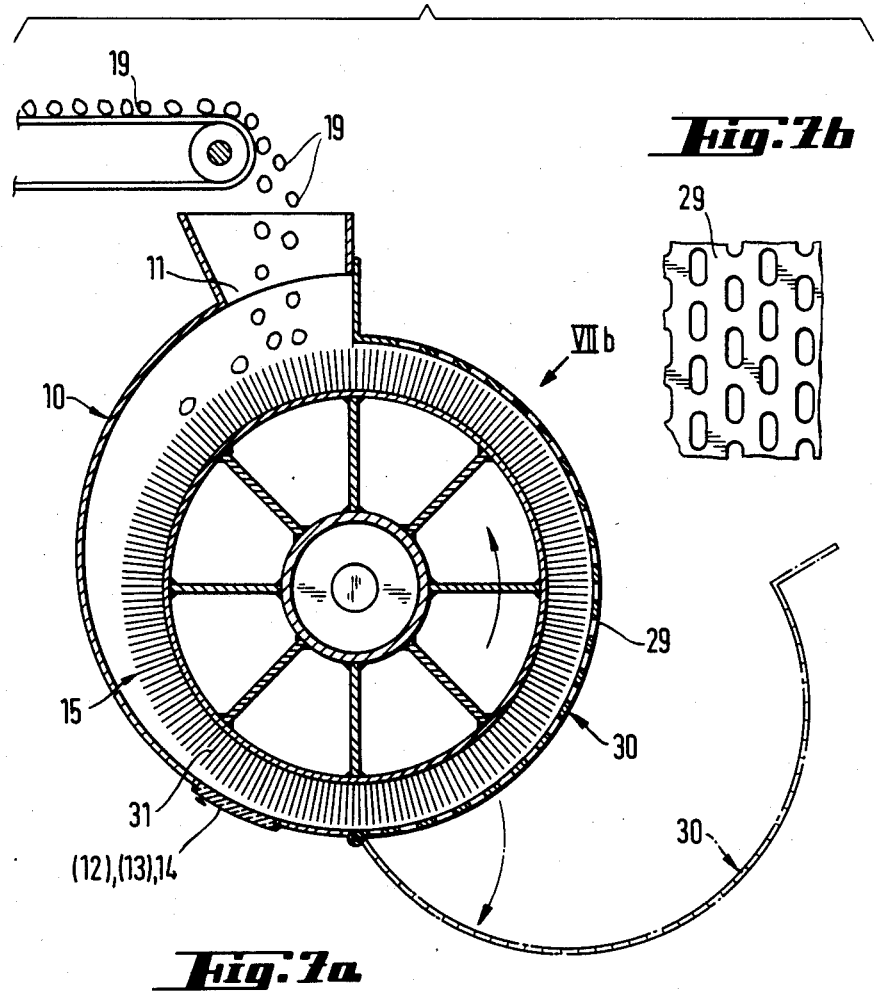

APPARATUS FOR CLEANING FRUITS AND VEGETABLES

The present invention relates to an apparatus for cleaning various objects and, in particular, fruits and vegetables, such as beets, sugar beets, carrots, red beets, tuberous celery, etc., in their raw state. The apparatus is suitable primarily for the canning industry as a means of cleaning fruits and vegetables such as potatoes, carrots and red beets following their pretreatment by conventional steam peelers.

If the produce is damaged in the pretreatment process, cells that are only slightly damaged or imperceptibly damaged may develop a corked texture which may not be penetrated by the steam of the steam peelers. Such spots on the fruits and vegetables are visible as dirty humps partially covered by peel even after the produce has passed through the steam peeling and brush washing equipment used in conventional processing operations. Heretofore, such damaged produce have had to be sorted out by manual labor, which is expensive in terms of personnel requirements, time comsumption and labor expense.

In order to avoid such a drawback in conventional operations using known machinery, the present invention provides an apparatus which is disposed downstream of the conventional brush washing machines and which removes from the fruits and vegetables any adhering impurities, thus solving the problem by reducing the sorting work to a minimum and permitting higher processing efficiency and superior exploitation of the raw material.

According to the present invention, an apparatus is provided which comprises a revolving conveyor drum having brushes, strips or fingers made of rubber or the like on its circumference and arranged in a housing. The housing is substantially closed except for feed and discharge openings, whereby the conveyor drum is at least partially surrounded by a plurality of stationary abrasive elements disposed between the housing and the conveyor drum. In a preferred embodiment of the invention, the abrasive elements are segmental sheet metal plates. The abrasive elements may be secured on the housing using bolts, with interconnected spacers between each element. Alternatively the abrasive elements may be guided and supported in slots of section supports such as U-shaped or L-shaped supports, thus facilitating the installation work.

As a rule, the abrasive elements should have an overall straight surface. However, on the side facing the conveyor drum, the overall surface of the elements may be wavy or corrugated. This surface may comprise parts disposed closer to and farther removed from the brush or conveyor drum. It has been found that it is advantageous for the overall surface to be saw-tooth shaped, thus facilitating the rotation of the fruit in the dropping stage.

The abrasive element may be a curved plate perforated by oblong holes. Behind said perforated plate, the housing may be designed to have a hinged cleaning flap.

Furthermore, special guiding and rubbing strips may be secured on the side of the abrasive elements facing the conveyor drum.

For the purpose of adjusting the device to fruits and vegetables of different sizes and for increasing or reducing the contact pressure of the brush on the produce, the conveyor drum may be supported in the housing in a way such that it can be adjusted in the direction of the abrasive elements, rotating either closer to or away from said elements. Conversely, the conveyor drum may be stationary and the abrasive elements adjustable. For achieving different ways of treating the fruits and vegetables, several closable discharge openings are provided in the lower part of the housing, distributed over the length of the apparatus. A common collecting chute may be arranged beneath these discharge openings for collecting the fruit and vegetables discharged from the apparatus, and a collecting trough may be provided in the housing beneath the abrasive elements for collecting the waste material produced in the peeling operation.

Other objects and features of the present invention will become apparent from the following detailed description considered in connection with the accompanying drawings, which disclose several embodiments of the invention. It is to be understood that the drawings are to be used for the purpose of illustration only, and not as a definition of the limits of the invention.

In the drawing wherein similar reference characters denote similar elements throughout the several views:

FIG. 2 is a longitudinal cross sectional view through the apparatus of FIG. 1;

FIG. 3 is an elevational view of an individual abrasive element secured by bolts;

FIG. 4 is an elevational view of an individual abrasive element supported by a sectional iron support;

FIG. 7 shows a device having a plate with oblong holes as the abrasive element.

Figure 1:
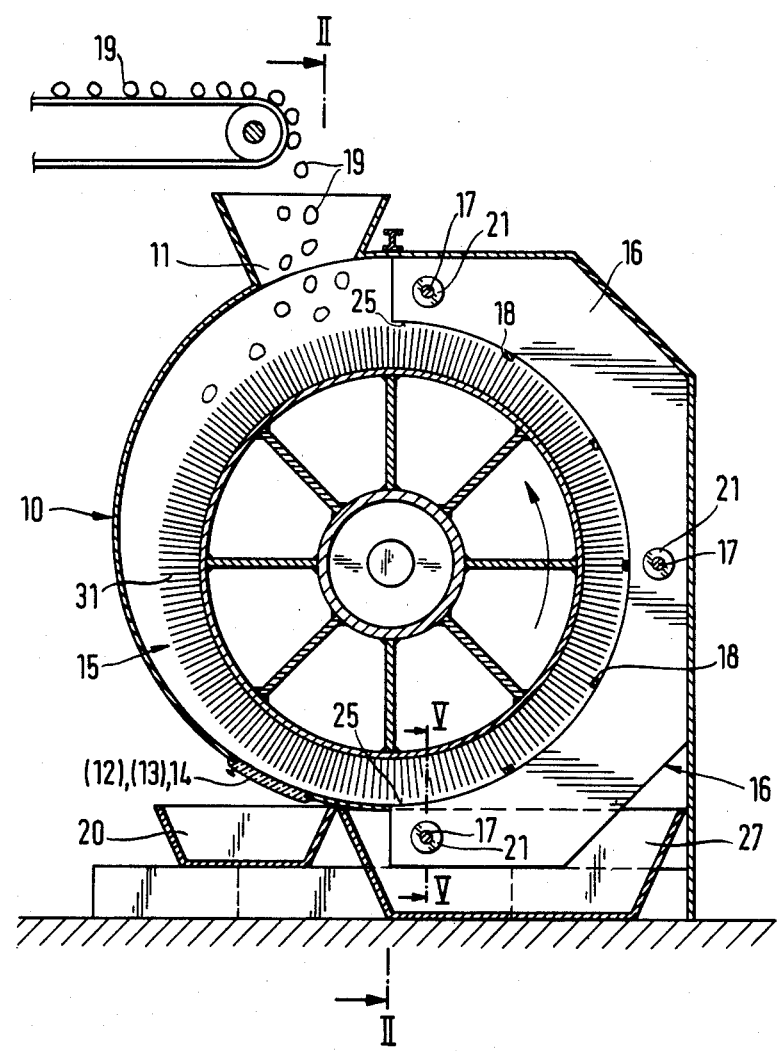
FIG. 1 is a cross sectional view of the apparatus according to the present invention.

Referring to FIGS. 1 and 2 of the drawings, there is shown the apparatus having a housing 10, a loading opening or hopper 11 for the fruits and vegetables 19 provided on the housing. Furthermore, various discharge openings 12, 13 and 14 are portrayed as clearly seen in FIG. 2. These openings are closable and their covers may have a sight or viewing window permitting the operator to check whether the produce have to be treated further or whether they can be discharged from the device. A common collecting chute 20 is disposed beneath the discharge openings for collecting the produce, and a collecting trough 27 is provided beneath the abrasive elements, designated 16, for collecting the waste material.

A conveyor drum 15 revolves within the interior of housing 10 and is provided on its circumference with brushes, strips or fingers 31 made of rubber for engaging the produce. Said drum 15 cooperates with a plurality of segmental abrasive elements 16, which are secured in a fixed position within housing 10. FIG. 2 shows additional abrasive elements 18 which are fitted on the side of abrasive elements 16 facing conveyor drum 15. These additional elements 18 serve to guide the produce through the device.

Figure 5:
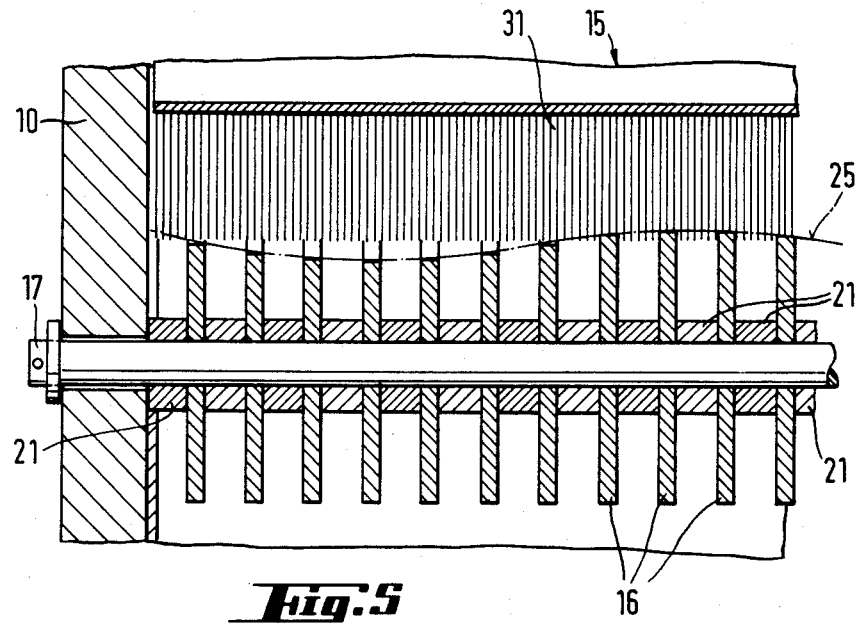
FIG. 5 is an enlarged view of abrasive elements having an overall corrugated or wavy surface.

FIGS. 3 and 4 show the segmental design of abrasive elements 16. Both FIGS. 3 and 5 show that the abrasive elements are assembled with the help of the bolts 17 and spacing rings or spacers 21. In FIG. 4, abrasive elements 16 are guided and supported in slots 24 of the U-shaped iron supports 22 and L-shaped iron supports 23. In this latter arrangement, the abrasive elements can be installed and removed in a simple manner by removing the L-shaped supports, which are connected by a frame construction.

Figure 6:
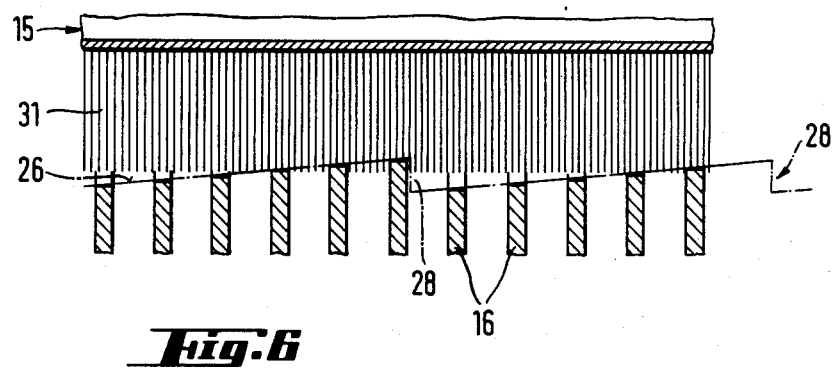
FIG. 6 is an enlarged view similar to FIG. 5 of abrasive elements with a saw-tooth shaped overall surface.

In addition to illustrating the assembly of the abrasive elements, FIG. 5 clearly shows an overall wavy or corrugated surface 25 of the abrasive elements 16. This surface permits conveyor drum 15 to act within different zones at different pressures on the produce passing between the conveyor drum and the abrasive elements. FIG. 6 shows a saw-tooth shaped surface 26 of the abrasive elements 16 with a drop stage 28, which ensures the rotation of the fruit.

In the operation of the produce cleaning apparatus, the produce is continuously loaded through feeding hopper 11 into the machine where it is seized by revolving conveyor drum 15 and admitted into the working part of the machine. The adjustability of the conveyor drum or abrasive elements permits the adjustment thereof to the size of the fruits to be processed in a given case, and the regulation and application of the amount of pressure required, as determined by the degree to which the produce is soiled.

Conveyor drum 15 forces the fruit against the working zone of the machine. The conveying and the rubbing or abrasive strips 18, which are installed in the working zone in an inclined position, guide the fruit on a sloped path across abrasive elements 16. At the same time, they also assume a part of the cleaning function. Finally, these strips guide the fruit towards the end of the machine. As a result of the corrguated or saw-tooth-like shape of the working zone, different pressures are applied to the fruit by the conveyor drum, so that a rotation of the fruit ahead of the conveying and rubbing or abrasive strips is achieved only in the valleys of the wave. This rotation provides an additional cleaning effect. The arrangement of the conveying and abrasive strips in the working zone of the machine is selected in such a way that, with an assumed working length of the machine of 2 meters, the fruit can be passed through the working zone several times, whereupon it may be discharged through outlet openings 12, 13 and 14 after it has completed a sufficient number of passages, depending on how soiled the produce is.

FIG. 7 shows the device with a curved plate comprised of oblong holes serving as the abrasive element. A hinged cleaning flap 30 is provided on the housing covering the rear of abrasive element 29 for facilitating the cleaning of the abrasive element.

While only several embodiments of the present invention have been described, it is obvious that many changes and modifications may be made thereunto, without departing from the spirit and scope of the invention.

What is claimed is:

1. An apparatus for cleaning fruits and vegetables, comprising:
   (a) a substantially closed housing having feed and discharge openings for said fruits and vegetables;
   (b) a conveyor drum rotatable in said housing and having brush-like elements disposed on its circumference;
   (c) a multiplicity of stationary abrasive elements arranged in said housing generally opposite to said brush-like elements along at least a portion of the rotary path thereof and disposed to cooperate with said brush-like elements to abrade and clean fruit and vegetables fed therepast and therebetween by said brush-like elements; and
   (d) a multiplicity of guide and abrasive strips disposed in said housing generally opposite to said brush-like elements and oriented to guide fruit and vegetables fed into said housing through said feed opening generally past said abrasive elements and toward said discharge openings, said strips also serving to abrade and clean fruit and vegetables fed therepast.

2. The apparatus as defined in claim 1, wherein the abrasive elements are segmental sheet metal plates.

3. The apparatus as defined in claim 1, wherein the abrasive elements are secured by bolts with a spacing provided between each element by means of interconnected spacing rings.

4. The apparatus as defined in claim 2, wherein the abrasive elements are guided and supported in a plurality of spaced apart slots formed by section supports disposed in said housing.

5. The apparatus as defined in claim 2, wherein the abrasive elements, on the side facing the conveyor drum, are disposed in a staggered manner so as to substantially form an intermittent smoothly curving and undulating edge profile wherein certain of said abrasive elements project into the path of said brush-like elements, and other of said abrasive elements are spaced slightly away from the path of said brush-like elements.

6. The apparatus as defined in claim 2, wherein the abrasive elements, on the side facing the conveyor drum, substantially form an intermittent saw-tooth shaped edge profile wherein certain of said abrasive elements project into the path of said brush-like elements, and other of said abrasive elements are spaced slightly away from the path of said brush-like elements.

7. The apparatus as defined in claim 1, wherein a plurality of discharge openings are provided in the lower part of said housing distributed over the length thereof, said discharge openings being closable.

8. The apparatus as defined in claim 7, which further comprises a common collecting chute arranged beneath said discharge openings.

9. The apparatus as defined in claim 8, which further comprises a collecting trough disposed in said housing beneath said abrasive elements for the material collected in the peeling operation.

10. The apparatus as defined in claim 1, wherein the surfaces of said multiplicity of stationary abrasive elements, arranged generally opposite to said brush-like elements, are substantially arcuate.

11. The apparatus as defined in claim 1, wherein said abrasive elements are disposed in said housing perpendicular to the axis about which said drum is rotatable.

12. An apparatus for cleaning fruits and vegetables, comprising:
   (a) a substantially enclosed housing having feeding and discharge openings for said fruits and vegetables;
   (b) a conveyor drum rotatable in said housing and having brush-like elements disposed on its circumference;
   (c) an abrasive element disposed adjacent the brush-like circumferential surface of said conveyor drum at least partially surrounding the circumference of said drum in the form of a perforated plate; and
   (d) a cleaning flap hingedly connected to said housing and covering the rear of said abrasive element in order to clean said abrasive element, the fruits and vegetables to be cleaned thereby conveyed by said brush-like elements and forcefully engaging said abrasive element, thereby effecting a cleaning action.

* * * * *